United States Patent [19]
Meyer, Jr.

[11] 3,968,762
[45] July 13, 1976

[54] TRIPLE HYBRID WATERCRAFT

[75] Inventor: John R. Meyer, Jr., Kensington, Md.

[73] Assignee: The United States of America as represented by the Secretary of the Navy, Washington, D.C.

[22] Filed: Aug. 21, 1975

[21] Appl. No.: 606,675

[52] U.S. Cl. .................. 114/66.5 H; 114/67 A; 115/16
[51] Int. Cl.² ...................... B63B 1/18
[58] Field of Search .............. 114/66.5 R, 66.5 H, 114/67 A; 115/11, 12 R, 14, 15, 16

[56] References Cited
UNITED STATES PATENTS 3,390,655  7/1968  Quady et al. ............... 114/66.5 H
3,871,317  3/1975  Szpytman .................. 114/66.5 H Primary Examiner—Stephen G. Kunin
Assistant Examiner—Jesus D. Sotelo
Attorney, Agent, or Firm—R. S. Sciascia; Q. E. Hodges

[57] ABSTRACT

A watercraft combining the physical and hydrodynamic features of a catamaran, a hydrofoil, and a rigid sidewall air cushion vehicle that might be considered a triple hybrid (TRIBRID). The TRIBRID is intended to operate as a multi-modal vehicle in the approximate speed range of 0–100 knots. The vehicle from at rest to operational speed, obtains its lift at first from 100% buoyancy of catamaran hulls, then from dynamic lift of hydrofoils, and finally from powered aerostatic lift from a captured air cushion. A combination of two or all lift modes may be used through speed changes and at intermediate speeds.

5 Claims, 6 Drawing Figures

TRIPLE HYBRID WATERCRAFT

The invention described herein may be manufactured and used by or for the Government of the United States of America for governmental purposes without the payment of any royalties thereon or therefor.

BACKGROUND OF THE INVENTION

This invention relates generally to watercraft and more particularly to a watercraft using in combination and sequence the physical and hydrodynamic features of a catamaran, a hydrofoil, and a rigid sidewall air cushion craft, and may be considered a triple hybrid.

Traditionally, the prior art craft are single mode, that is they rely for lift or bouyancy on a hull, either single or catamaran style, on hydrofoils, or on an air cushion, often depending on the speed range in which they primarily operate. The latter two, of course, require a floatation hull, used when the craft is at rest or when it is beginning or ending a run. They are not truly hybrid designs, but rather require a floatation hull as discussed, and each mode is limited in speed and power requirements.

SUMMARY OF THE INVENTION

Briefly the instant invention overcomes the disadvantages of the prior art by providing a tri-modal hybrid wherein the craft obtains its lift from the buoyancy of its catamaran hulls, the dynamic lift from hydrofoils, or from the powered aerostatic lift from a captured air cushion, and a combination thereof. One of the major advantages achieved by the multi-modal feature is the relatively favorable lift-to-drag ratios (L/D) of each lift-producing mode over the different portions of the speed spectrum from "at rest" to "maximum speed". The buoyant bodies (catamarans) produce relatively high L/D in the low end of the speed spectrum, the hydrofoil produces relatively high L/D in the mid-range, and the low length-to-beam ratio powered aerostatic lift system produces relatively high L/D in the high end of the speed spectrum. Hence over the entire speed range there are two transition speeds, which can be selected to minimize drag. Depending on the particular sea condition encountered, any one, or combination of modes can be selected, each of which has a different operational waterline.

Major detailed physical features of the TRIBRID include retractable foils to obtain minimum drag in the buoyant and aerostatic modes. Optionally however the foils may be utilized to improve ride quality and dynamic stability in heave, pitch, and roll under rough sea conditions, and to improve lateral control in the air cushion, aerostatic mode. Also the fore and aft seals used in the air cushion mode are retractable to minimize drag in the buoyant catamaran and the hydrofoil-borne modes.

The propulsion system may include multiple marine gas turbines driving alternatively, a subcavitating propeller (through reduction gears) for the buoyant mode, or a waterjet system for the hydrofoil and air cushion modes. The possible alternative use of the subcavitating propeller propulsion system would permit craft operation for relativey long periods of time in the fully buoyant, low-speed mode giving a range/payload advantage. If prolonged operation at low speed were not contemplated, a less complex system, without a propeller, could be adopted.

OBJECTS OF THE INVENTION

Accordingly, an object of the present invention is to provide a new and improved multi-modal water craft.

Another object is to provide a water-craft with efficient operation over a broad range of speeds.

A further object of the present invention is to provide three separate and independent means of lift support for a watercraft permitting full buoyancy, dynamic lift and powered aerostatic lift for efficiency over a broad range of speeds.

A still further object of the instant invention is to provide a watercraft combining several lift modes to improve operation in a wide range of sea states and conditions.

Still another object of the instant invention is to provide dual propulsion system for a multi-modal watercraft capable of driving a water jet or a subcavitating propeller.

BRIEF DESCRIPTION OF THE DRAWINGS

A more complete understanding of the invention and many of the attendant advantages thereto will be readily appreciated as the same become better understood by reference to the following detailed description when considered in connection with the accompanying drawings, wherein.

DESCRIPTION OF THE PREFERRED EMBODIMENT

Figure 1:
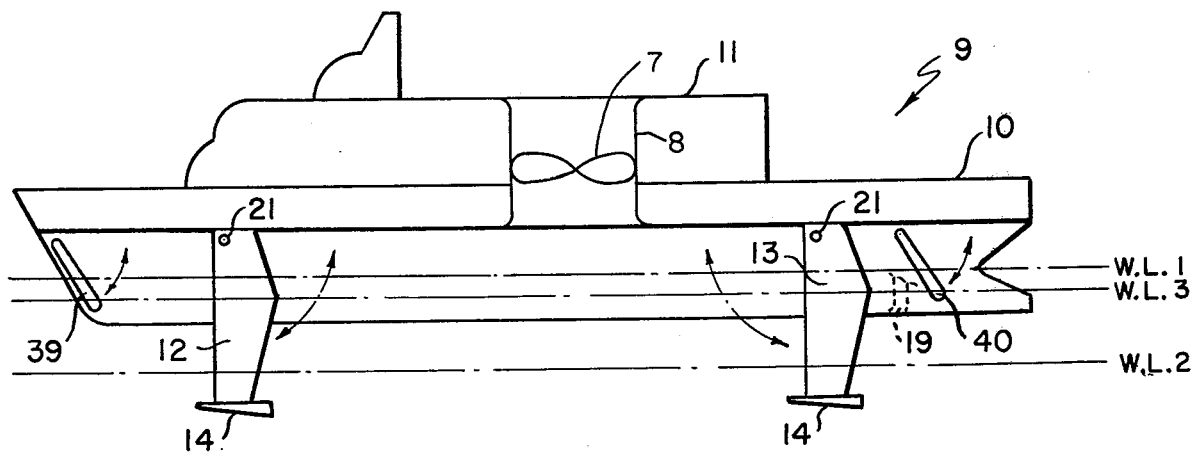
FIG. 1 is a side view of the Triple Hybrid watercraft with the hydrofoil system extended.
Figure 2:
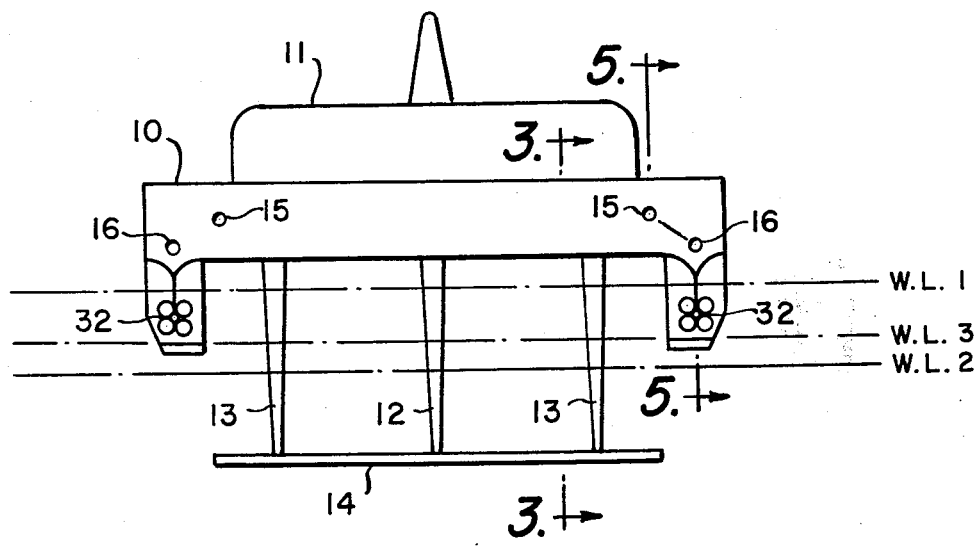
FIG. 2 is an aft end view showing the aft double struts and hydrofoil, the forward single strut (hydrofil obscured), the rigid sidewalls and propellers, and the upper hull section.

Referring now to the drawings wherein like reference numerals refer to like parts throughout the several views, there is shown generally in FIGS. 1 and 2 the preferred embodiment of a triple hybrid watercraft 9, having an upper hull and sidewall structure 10 and a superstructure 11.

The aft end cross-sectional view of FIG. 2 shows the general main hull configuration and the rigid sidewalls 10 in relationship to a strut 12 (also used as a rudder for steering) supporting a forward hydrofoil (not shown, because obscured) and a pair of struts 13 supporting an aft hydrofoil 14 in an inverted Pi ($\pi$) configuration. The superstructure above the main hull and sidewalls 10 provides various operational purposes including conning, observation, control, and habitability spaces. The main hull 10 contains the propulsion system (not shown in detail) which can provide thrust through either propellers 32, or waterjets 15 and 16, all generally and best shown in FIG. 2. An air cushion fan 7 in a duct 8 is mounted in the superstructure 11 to supply air for the air cushion mode.

Figure 3:
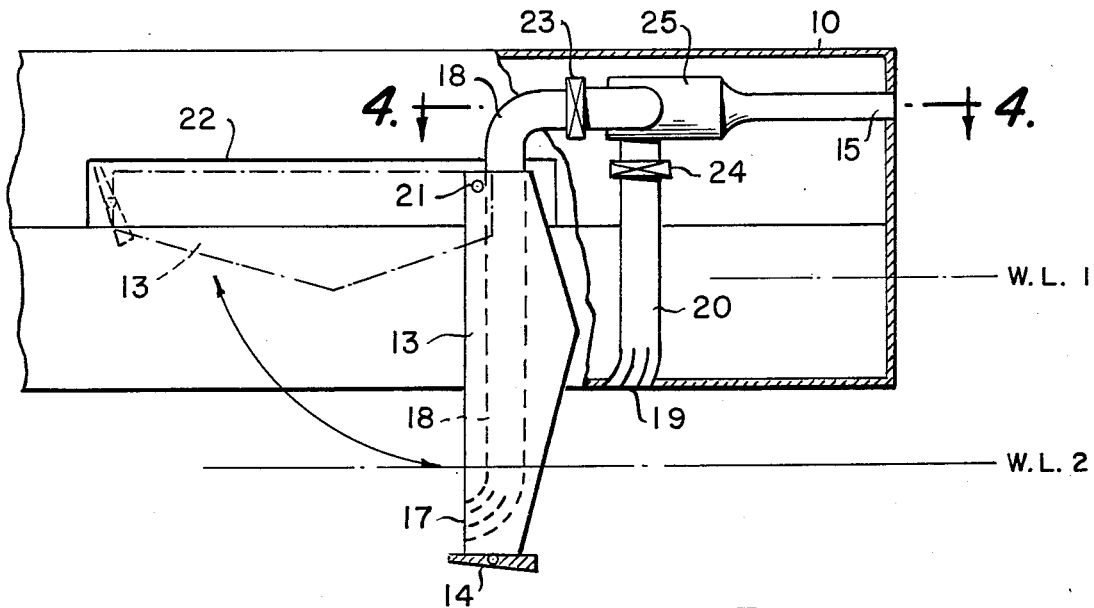
FIG. 3 is a partial side view section 3—3 of FIG. 2 of the aft strut and hydrofoil showing the extended and retracted position.

The main features of the triple hybrid, multi-modal, or "TRIBRID", depends on its ability to extend and to retract the struts 13, and hydrofoils 14 systems and the sidewall cushion-seal system 10, part of the main hull. Referring in particular to FIG. 3, showing section 2—2 of FIG. 2, the extended position of the aft strut 13, and hydrofoil 14 are shown in solid line, and the retracted position of the strut 13 and hydrofoil 14 are shown in phantom dashed lines. The struts 13 pivot about a point 21 and when retracted, the assembly nests in a recess 22 in the upper hull 10. FIG. 3 also shows schematically the two duct systems which provide water for the waterjet propulsion system (not all shown) in either the foilborne or cushionborne modes. In the hydrofoilborne mode, water enters an intake 17, in the struts 13. A duct 18, and perhaps turning vanes contained therein, turn and conduct the intake water up an internal portion of the strut to a valve 23 and thence to a waterjet pump 25 shown generally.

Figure 4:
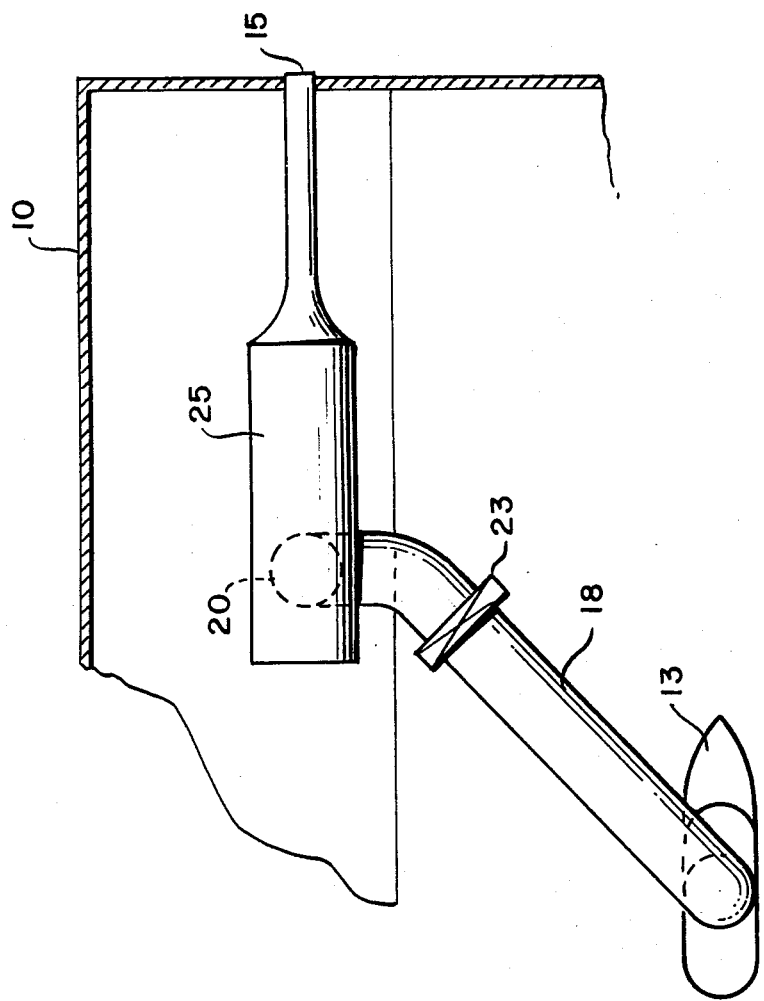
FIG. 4, is a horizontal transverse section 4—4 of FIG. 3, showing a schematic of the ducting arrangement for the water jet propulsion system.

In the air cushionborne mode, the struts 12 and 13 and the hydrofoils 14 are usually retracted, and thence intake water is provided through a flush-mounted intake 19. A conduit 20, also perhaps with turning vanes therein, conduct the water to a valve 24 and thence to the same waterjet pump 25 for propulsion. It is to be understood that alternatively, dagger-type inlets (not shown) may be used at the bottom of each sidewall in place of flush inlets 19. Of course, either valve 23 or 24 would be turned off depending on which inlet is used. Referring to FIG. 4 which is section 4—4 of FIG. 3, there is shown in more detail schematically, the relationship of the duct 18 and conduit 20 and their respective valves 23 and 24 that feed the same waterjet pump 25.

Figure 5:
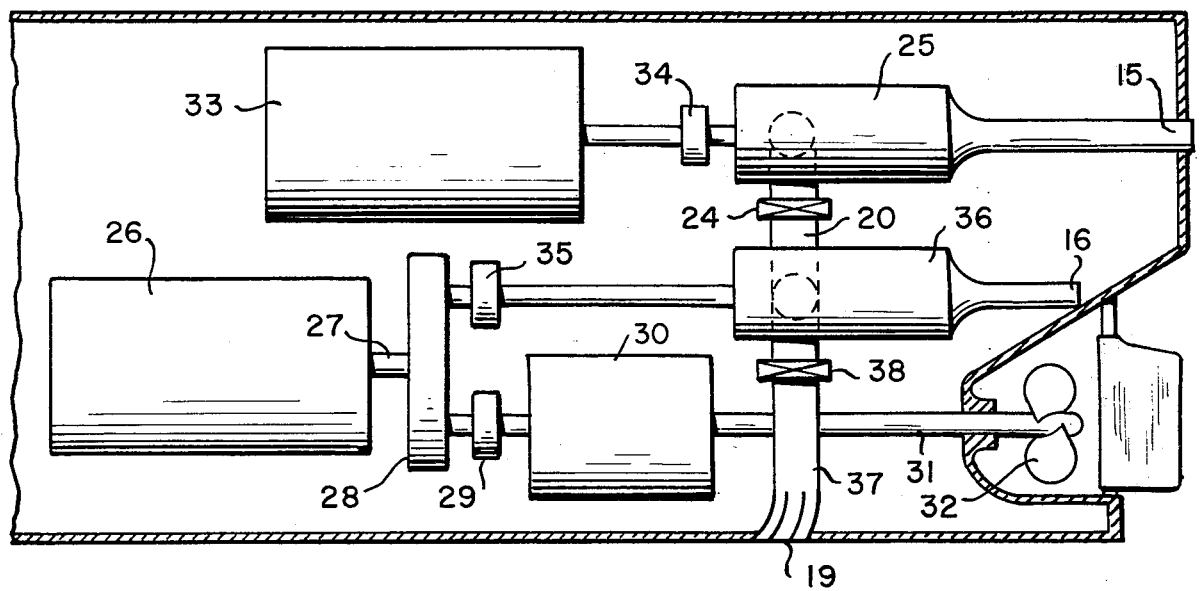
FIG. 5 is a side view section 5—5 of FIG. 2, showing a schematic arrangement of the dual propulsion system for the TRIBRID.

FIG. 5 a cross-section 5—5 of FIG. 2, shows an overall schematic of the dual propulsion system which may be considered typical of that housed in each sidewall and the extreme lateral portion of the upper hull structure 10. Each element of the novel dual propulsion system will be discussed in regard to the craft's mission requirements. When in the buoyant (low speed) mode wherein operation is at W.L. 1 thrust is provided by a propulsion system comprising a gas turbine engine 26, or the equivalent, the output of which is connected to a drive shaft and coupling 27, connected into a dividing gearbox 28. In this buoyant mode, a clutch 29, connected to the gearbox 28 is engaged, and another clutch 35 of the dividing gearbox is disengaged, so power is transmitted to a reduction gear 30 and thence to a propeller shaft 31 connected to a subcavitating propeller 32. When the hydrofoil-borne mode starts (low-to-mid-speed range), a second gas turbine engine 33, similar to engine 26, is operated when the hydrofoils 14 and struts 13 are extended. Its power is fed to the second shaft coupling assembly 34 and thence to the waterjet pump 25 and thence through a nozzle 15. Valve 24 must be closed during this operation to prevent air from entering the pump 25 through the conduit 20. A unique feature of this dual propulsion system is that while the sidewalls 10 are still in the water (semi-buoyant) it is possible to take water through inlets 19 to supplement that flowing into the inlets 17 in the struts. This dual inlet is accomplished by maintaining valve 24 open until the sidewalls rise out of the water, that is until the waterline approaches the bottom of the sidewalls. Also during transition from the buoyant mode to the hydrofoil mode, gas turbine engine 26 may be shut down as thrust is transferred from propeller 32 to waterjet nozzle 15.

In addition to the various combinations discussed above, the system lends itself to the additional thrust from another nozzle 16, to augment that of nozzle 15. This is accomplished by maintaining power on gas turbine engine 26, disengaging clutch 29 and engaging clutch 35 to operate the waterjet pump 36. Water would be fed to pump 36 through a duct (not shown) running parallel with duct 18 in strut 13. In this case, a valve 38 (best shown in FIG. 5) would be closed.

During transition to the air cushion mode (high speed) from the hydrofoil mode (mid speed), the sidewalls are lowered to be brought into contact with the water surface at waterline W.L. 3, from the hydrofoil mode operating at waterline W.L. 2, at which time a forward seal 39 and an aft seal 40 (best seen in the side view of FIG. 1) are lowered in a conventional manner into an operating position to seal in the powered aerostatic air cushion. Simultaneously the powered aerostatic air cushion system, of the type well known in the art is started and operated to provide lift from the captured air cushion. The air cushion volume or plenum is formed by the sidewalls 10 the forward seal 39, and the aft seal 40. The air cushion mode is the highest speed mode of this TRIBRID watercraft. When the full air cushionborne mode (W.L. 3) is achieved, the forward strut 12 and its hydrofoil, and the aft Pi ($\pi$) shaped struts 13 and hydrofoil 14 are retracted about pivot points 21, by any conventional means, for example hydraulically (see phantom view in FIG. 3) into the hull and sidewall structure 10. The foils on the forward strut 12 and aft struts 13 can be pivoted in a programmed fashion as the struts are rotated to minimize drag and avoid undesirable pitching moments in intermediate positions.

In this air cushion mode the water from the waterjet propulsion intakes 19 (see FIG. 3 and 5) splits into conduit 20 and duct 37, when valves 24 and 38 are open, and valve 23 is closed. The intake water is transferred to both pumps 25 and 36 and thence to the jet nozzles 15 and 16 to achieve the highest thrust for the high speed operation.

Figure 6:
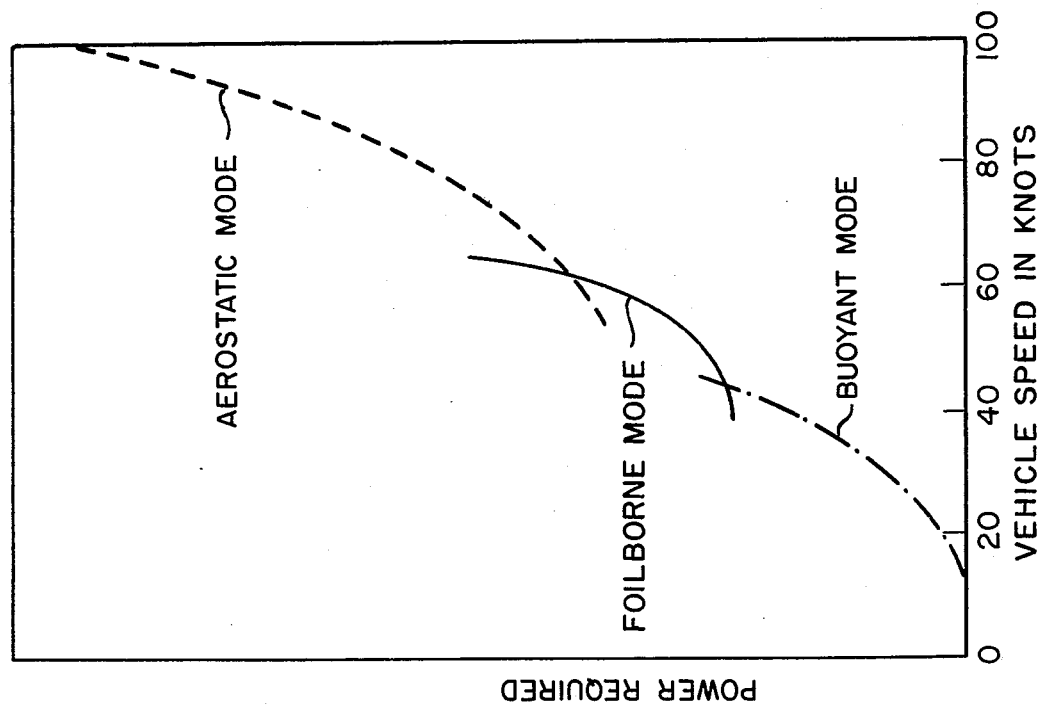
FIG. 6 is a graph of the approximate speed ranges for operation in each mode.

Throughout this specification the mode has been related mainly to speed ranges, power requirements, and sea conditions which give this tri-modal (TRIBRID) watercraft its unique capabilities. These relationships are readily shown in the graph of FIG. 6 showing the speed ranges, their overlap, and the relative power requirements for each range. As can be seen, the invention provides a truly novel and versatile watercraft.

Obviously, numerous modifications and variations of the present invention are possible in light of the above teachings, it is therefore to be understood that, within the scope of the appended claims, the invention may be practiced otherwise than as specifically described.

What is claimed is:

1. A multi-modal watercraft having a wide speed range with favorable lift-to-drag ratio resulting in good performance under various sea conditions comprising:
    a hull structure;
    a superstructure mounted on said hull;
    said hull structure includes a pair of buoyant sidewall structures attached to said hull structure;
    a hydrofoil and strut system attached to said hull structure;

a forward seal and an after seal attached to said hull and sidewall structure for forming an air cushion with said sidewall structure;

a propulsion engine for providing a rotational shaft output mounted in said hull and sidewall structure;

a dividing gearbox attached to said shaft output of said propulsion engine;

a set of clutches coupled to said dividing gearbox;

a subcavitating propeller selectively engagable to said gearbox with one of said clutches;

a waterjet propulsion pump selectively engagable to said gearbox with the other of said clutches; and at least one set of outlet jets and inlets for said propulsion pump.

2. The multi-modal watercraft of claim 1 wherein said propulsion system further comprises:

a second propulsion engine providing a rotational shaft output in said hull and sidewall structure;

a shaft coupling attached to said rotational shaft;

a second waterjet propulsion pump coupled to said shaft coupling; and a second set of outlet jets and inlets for said second propulsion pump.

3. The multi-modal watercraft of claim 2 wherein said waterjet propulsion pump inlets further comprise:

an inlet in each of said sidewalls;

at least one inlet in each of said rear struts; and a set of valves interposed between each inlet and each of said waterjet propulsion pumps for controlling flow and eliminating air induction when one or the other inlets are out of water.

4. The multi-modal watercraft of claim 3 wherein:

said hydrofoil and strut system is retractable about pivot points located in the hull and sidewall structure.

5. The multi-modal watercraft of claim 4 wherein said buoyant sidewall structure further comprise:

buoyant catamarans for one mode of operation, and air cushion containing elements for another mode of operation.

* * * * *